United States Patent Office.

EUGÈNE FOURNIER, OF PARIS, FRANCE.

DISINFECTANT COMPOSITION.

SPECIFICATION forming part of Letters Patent No. 650,933, dated June 5, 1900.

Application filed February 2, 1898. Serial No. 668,866. (No specimens.)

*To all whom it may concern:*

Be it known that I, EUGÈNE FOURNIER, a citizen of the Republic of France, residing at Paris, France, have invented a certain new and useful Improved Disinfectant, of which the following is a specification.

Numerous researches and experiments undertaken by me with a view of discovering a practical and complete solution of the problem of disinfection have led me to devise a new or improved disinfectant which when applied in a state of vapor diffused through buildings or over products, matter, or articles to be disinfected produces their absolute and complete disinfection.

This new disinfectant is composed of a mixture of formaldehyde, alcohol, and acetone. The following proportions have been found to give good results: formaldehyde, three parts; grain alcohol, (preferably 90°,) one part; acetone, one part. The quantities of this composition to be used vary, of course, with the size of buildings and quantity of products, articles, &c., to be disinfected, and I do not bind myself to the exact proportions given of the different liquids. The quantity to be used for each cubic meter to be disinfected may be fifteen cubic centimeters of formaldehyde, to which are added a third of acetone and a third of alcohol—that is to say, about five cubic centimeters of each of the two latter substances. This liquid mixture brought to a desired pressure, (preferably from three to four atmospheres,) so as to act in the state of vapor, completely and successfully fulfils the most difficult disinfecting operations, as has been proved by experiments.

I claim—

1. The herein-described disinfectant consisting of formaldehyde, grain alcohol and acetone, in or about in the proportions specified.

2. The herein-described disinfectant consisting of formaldehyde, grain alcohol, (about 90°,) and acetone, in or about in the proportions specified.

In testimony whereof I have signed my name to this specification in the presence of two subscribing witnesses.

EUGÈNE FOURNIER.

Witnesses:
 LOUIS SULLIGER,
 EDWARD P. MACLEAN.